July 6, 1943.  F. V. NUGENT  2,323,562
SHOE TREAD MEMBER
Filed March 24, 1942
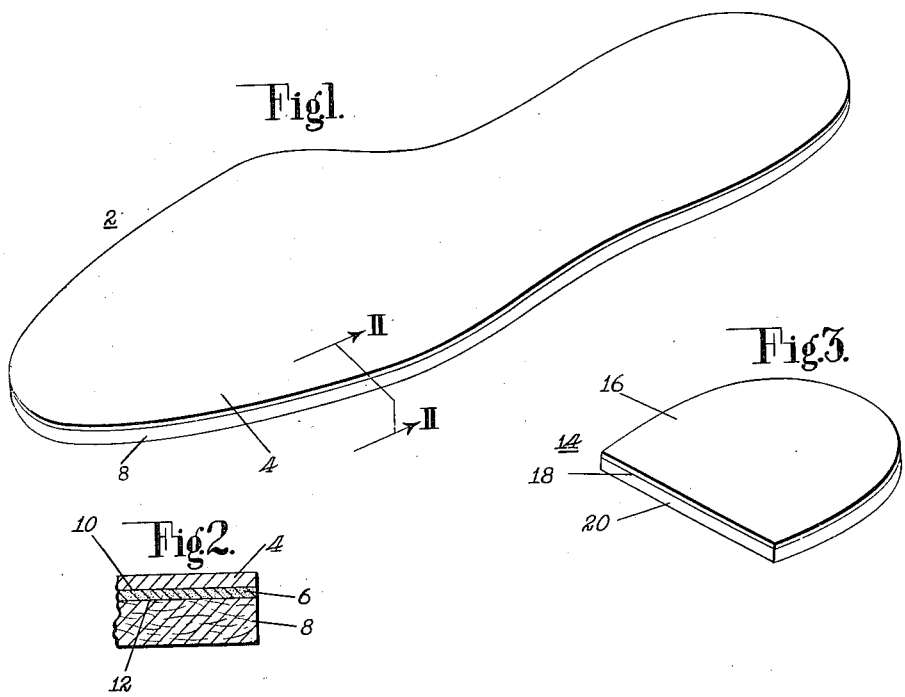
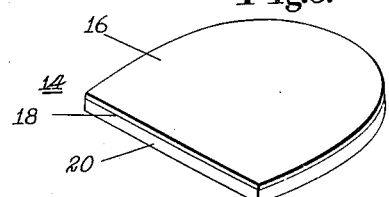
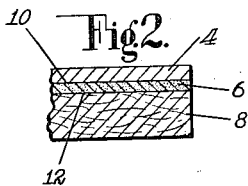
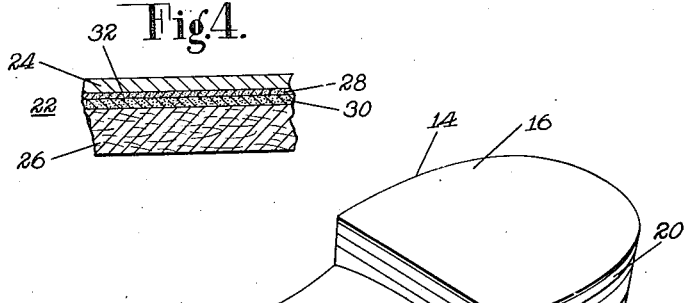
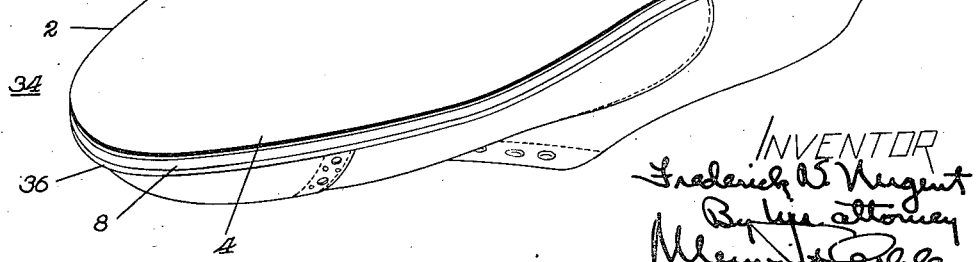
INVENTOR
Frederick V. Nugent
By his attorney Patented July 6, 1943

2,323,562

UNITED STATES PATENT OFFICE 2,323,562

SHOE TREAD MEMBER

Frederick V. Nugent, Abington, Mass., assignor to B. B. Chemical Co., Boston, Mass., a corporation of Massachusetts Application March 24, 1942, Serial No. 435,997

6 Claims. (Cl. 36—30)

This invention relates to shoe manufacture, and more particularly to tread members, such as outsoles and heel top lifts.

Vinyl resin in sheet form exhibits attractive possibilities as shoe material, but its utilization has involved shoemaking difficulties. Thus sheet vinyl resin does not constitute a satisfactory substance through which to pass stitches in preparing a tread member by a sewing operation, because of the tendency of the vinyl resin sheet to tear between the stitch holes. The disadvantages of using mechanical fastening means are obvious. On the other hand, in attempting to form shoe tread members by attaching vinyl resin sheet to leather by means of the usual commercial shoe cements, satisfactory adhesion for shoe tread purposes has not been obtained. This is the case if it is attempted to use pyroxylin, rubber cement, rubber latex, or polymerized chloroprene for this purpose.

An object of this invention is to provide a shoe tread member, such as an outsole or heel top lift, having a tread surface of sheet vinyl resin, and wherein the vinyl resin is securely and permanently attached to a leather layer.

In the accomplishment of the above and other objects, I have provided a shoe tread member having a tread surface of sheet vinyl resin and a backing layer of leather, and wherein a film whose basic constituents are a copolymer of butadiene and an acrylonitrile and a toughening agent is adhesively secured to said vinyl resin sheet and to the leather layer. The toughening agent preferably is of the group consisting of chlorinated rubber and vinyl resin.

Conveniently the tread member may be prepared by roughing the attaching surface of the vinyl resin sheet. A liquid dispersion or colloidal solution of a copolymer of butadiene and an acrylonitrile and a toughening agent may then be applied to the attaching surfaces of the vinyl resin sheet and the leather layer, and the solution permitted partially to dry. The vinyl resin sheet and the leather backing layer may then be pressed together with their butadiene copolymer surfaces in juxtaposition, whereby a film of butadiene-acrylonitrile copolymer-toughener is formed which is adhesively secured to the vinyl resin sheet and whereby the leather layer is adhesively secured to said butadiene copolymer film.

In an alternative form of the invention a film of chlorinated rubber may be deposited upon the roughed attaching surface of the vinyl resin sheet by applying thereto a solution of chlorinated rubber and permitting said solution to dry. A liquid dispersion or colloidal solution of a copolymer of butadiene and acrylonitrile and a toughening agent may then be applied to the dried film of chlorinated rubber and to the attaching surface of the leather layer and the vinyl resin sheet and the leather backing layer pressed together as described above.

The attaching pressure may be applied simultaneously over the areas to be joined as in a plate press or the pressure may be applied progressively as by passing the parts through wringer rolls.

By the present invention I have provided a tread member wherein the tread surface and the backing layer are secured together firmly and closely without gaping between the parts and wherein the parts will remain secured together even when subjected to the stresses and conditions encountered in shoe wear.

In the drawing,

Fig. 1 is a perspective view of a shoe outsole according to the invention;

Fig. 2 is a fragmentary enlarged diagrammatic sectional view taken on line II—II of Fig. 1;

Fig. 3 is a perspective view of a shoe heel top lift according to the invention;

Fig. 4 is a fragmentary enlarged diagrammatic sectional view of an alternative form of tread member according to the invention; and Fig. 5 is a perspective view of a shoe having an outsole and a heel lift in accordance with this invention.

The tread member contemplated by this invention has a sheet vinyl resin tread surface and a leather layer. The vinyl resin sheet material may comprise polyvinyl acetate, polyvinyl chloride, a copolymer of vinyl acetate and vinyl chloride, polyvinyl acetal, or other suitable vinyl resin. The vinyl resin sheet material ordinarily contains a suitable plasticizer such as dibutyl cellosolve phthalate or dibutyl sebacate.

The copolymer of butadiene and acrylonitrile may be obtained commercially in the form known as "Hycar," manufactured by the Hycar Chemical Co., Akron, Ohio. The material "Hycar" is plastic in the sense that it may be worked on the rolls of a rubber mill and compounded with other ingredients in a manner similar to that in which crude rubber is treated. Such copolymer of butadiene and acrylonitrile may be "cured" or "vulcanized" to a condition in which it is elastic rather than plastic and in which condition it resembles vulcanized rubber. This "curing" is probably a further polymerization of the plastic copolymer to a substantially fully polymerized condition rather than the addition of sulphur to the polymer, such as is considered to occur in the vulcanization of rubber. In the copolymer the proportions of butadiene and acrylonitrile may be varied. Suitable copolymers may also be obtained commercially under the trade name "Chemigum," manufactured by Goodyear Tire & Rubber Company, Akron, Ohio, or under the trade name "Buna N," manufactured by the Standard Oil Company of New Jersey.

As a toughening agent for the butadiene-acrylonitrile copolymer may be employed chlorinated rubber containing about 67% of chlorine and marketed under the trade names "Parlon" or "Tornesit" by the Hercules Powder Company, Wilmington, Delaware.

Another form of toughener suitable for the purposes of the invention is a copolymer of 88% vinyl chloride and 12% vinyl acetate marketed under the name of "VYHF" resin by Carbide and Carbon Chemicals Corporation.

The dispersions or colloidal solutions of a copolymer of butadiene and acrylonitrile and a toughening agent employed for the purposes of this invention may vary widely in composition. One which I have found very satisfactory and containing "Tornesit" as a toughener, is as follows:

| | Grs. |
|---|---|
| Hycar | 195 |
| Floated silica | 39 |
| Zinc oxide | 9.7 |
| Sulfur | 3.6 |
| Stearic acid | 2.7 |
| 125 cps. Tornesit | 200 |
| Stabellite ester #2 (hydrogenated rosin ester) | 30 |
| Toluol | 800 |
| Methyl ethyl ketone | 770 |

Another dispersion or colloidal solution of a copolymer of butadiene and acrylonitrile and containing VYHF resin as a toughening agent is as follows:

| | Grs. |
|---|---|
| Hycar | 195 |
| Floated silica | 39 |
| Zinc oxide | 9.7 |
| Sulfur | 3.6 |
| Stearic acid | 2.7 |
| VYHF resin | 200 |
| Methyl ethyl ketone | 1370 |

For the alternative form of the invention wherein a separate film of chlorinated rubber is employed the chlorinated rubber may be used in the form of a solution of Tornesit in a solvent therefor. A suitable solution is one containing 15 to 20% by weight of Tornesit dissolved in a solvent composed of equal parts of methyl ethyl ketone and toluene. The Tornesit itself may have a viscosity characteristic of from 5 to 1000 centipoises. If desired, the chlorinated rubber solution may contain dissolved vinyl resin and in such case the solution may contain about 10% by weight of Tornesit together with 10% by weight of low molecular weight vinyl resin (for example, "VYHF" resin) dissolved in equal parts of methyl ethyl ketone and toluene.

In Figs. 1 and 2 there is illustrated a tread member in the shape of an outsole 2 which has the tread surface layer 4 composed of a vinyl resin sheet. Adhesively secured to the vinyl resin layer 4 is a film 6 of copolymer butadiene and acrylonitrile and a toughener. A layer of leather 8 is adhesively secured to the butadiene-acrylonitrile copolymer-toughener film 6.

In preparing the outsole 2 a leather layer 8 of outsole leather stock and a tread surface layer 4 of vinyl resin sheet both of suitable size and shape may be provided. The attaching surface 10 of the vinyl resin sheet 4 and the attaching surface 12 of the leather layer 8 may be roughed in any suitable manner. To the attaching surfaces 10 and 12 may then be applied by brush or in any other suitable manner a liquid dispersion or colloidal solution containing a copolymer of butadiene and acrylonitrile and a toughener such as hereinbefore described. When the copolymer-toughener cement on the attaching surface 10 of the vinyl resin sheet 4 and on the attaching surface 12 of the leather layer 8 has dried to a condition in which the respective cement-coated surfaces are adhesive to each other, which may require a period in the neighborhood of an hour, the resin sheet 4 and leather layer 8 may be pressed together with their copolymer-coated surfaces in juxtaposition to form a laminated structure embodying the copolymer-toughener film 6.

The vinyl resin sheet 4 and leather layer 8 may be pressed together in a hydraulic or other press at a pressure of about 50 pounds or more per square inch and for a time about 5 seconds or longer. Alternatively, the vinyl resin sheet 4 and leather layer 8 may be passed through wringer rolls under a pressure of about 50 pounds or more per square inch.

In Fig. 3 I have shown a tread member in the shape of a heel top lift 14 which has a tread surface 16 composed of a vinyl resin sheet. A film 18 of a copolymer of butadiene and acrylonitrile and a toughener is adhesively secured to the vinyl resin sheet 16 and a layer of leather 20 is adhesively secured to the copolymer-toughener film 18.

The heel top lift 14 may be prepared by providing a suitably shaped vinyl resin sheet 16 and a suitably shaped leather heel layer 20 and associating them with the copolymer-toughener film 18 in the manner described hereinabove with respect to the outsole 2.

The outsole 2 and top lift 14 might also be prepared by securing together vinyl resin sheets and leather layers of indeterminate size in the manner described above and dieing out or cutting out outsoles and top lifts therefrom.

In Fig. 4 I have illustrated an alternative form of tread member structure 22 wherein there is provided a tread member surface 24 of vinyl resin sheet and a leather layer 26. In the tread member 22 a film 28 of chlorinated rubber is adhesively secured to the vinyl resin sheet 24. A film 30 whose basic constituents are a copolymer of butadiene and an acrylonitrile and a toughening agent is adhesively secured to the chlorinated rubber film 28 and the leather layer 26 is adhesively secured to the butadiene-acrylonitrile-toughener film 30.

In preparing the tread member 22 the attaching surface 32 of vinyl resin sheet 24 may be roughed in any suitable manner. To the roughed attaching surface 32 may be applied by brush or other suitable means a chlorinated rubber solution such as hereinbefore described. This chlorinated rubber solution may be permitted to dry in the atmosphere for from about 15 minutes to an hour or longer whereby a chlorinated rubber film 28 is deposited upon and adhesively attached to the attaching surface 32 of the vinyl resin sheet 24.

Following the securing of the chlorinated rubber film 28 to the vinyl resin sheet 24 the leather layer 26 and the chlorinated-rubber-film-coated vinyl resin sheet 24 may be brought together with the butadiene-acrylonitrile-toughener film 30 intermediate the leather layer 26 and chlorinated rubber film 28 in the manner described hereinabove for joining a leather layer and vinyl resin sheet in the absence of a chlorinated rubber film.

In Fig. 5 I have illustrated a shoe 34 embodying an outsole 2 and heel top lift 14 according to the invention. Thus, the outsole 2 with the vinyl resin tread surface 4 and leather layer 8 is shown as adhesively secured to the welt 36 by a suitable adhesive such as pyroxylin. The heel top lift 14 which has the vinyl resin tread surface 16 and the leather layer 20 is shown as adhesively secured to the heel base layer 38 by a suitable adhesive such as pyroxylin. Alternatively, the outsole 2 may be secured to the welt 36 by stitching in any suitable manner and, furthermore, the heel top lift 14 may be secured to the heel base by nails in any suitable manner.

Having described my invention, what I claim as new and desire to secure by Letters Patent of the United States is:

1. A tread member for shoes comprising a tread surface layer of vinyl resin, a film whose basic constituents are a copolymer of butadiene and an acrylonitrile, and a toughening agent of the group consisting of chlorinated rubber and vinyl resin, adhesively secured to said vinyl resin tread surface layer, and a layer of leather adhesively secured to said butadiene-acrylonitrile copolymer-toughener film.

2. A tread member for shoes comprising a tread surface layer of vinyl resin, a film whose basic constituents are a copolymer of butadiene and an acrylonitrile, and chlorinated rubber toughening agent, adhesively secured to said vinyl resin, and a layer of leather adhesively secured to said butadiene-acrylonitrile copolymer-chlorinated rubber film.

3. A tread member for shoes comprising a tread surface layer of vinyl resin, a film whose basic constituents are a copolymer of butadiene and an acrylonitrile, and vinyl resin toughening agent, adhesively secured to said vinyl resin, and a layer of leather adhesively secured to said butadiene - acrylonitrile copolymer - toughener film.

4. A shoe structure according to claim 1 wherein the tread member is an outsole.

5. A shoe structure according to claim 1 wherein the tread member is a heel top lift.

6. A tread member for shoes comprising a tread surface layer of vinyl resin, a film of chlorinated rubber adhesively secured to said vinyl resin, a film whose basic constituents are a copolymer of butadiene and a acrylonitrile, and a toughening agent of the group consisting of chlorinated rubber and vinyl resin, adhesively secured to said chlorinated rubber film, and a layer of leather adhesively secured to said butadiene-acrylonitrile copolymer-toughener film.

FREDERICK V. NUGENT.